No. 884,272. PATENTED APR. 7, 1908.
G. H. GRIMM.
EVAPORATOR.
APPLICATION FILED DEC. 8, 1906.
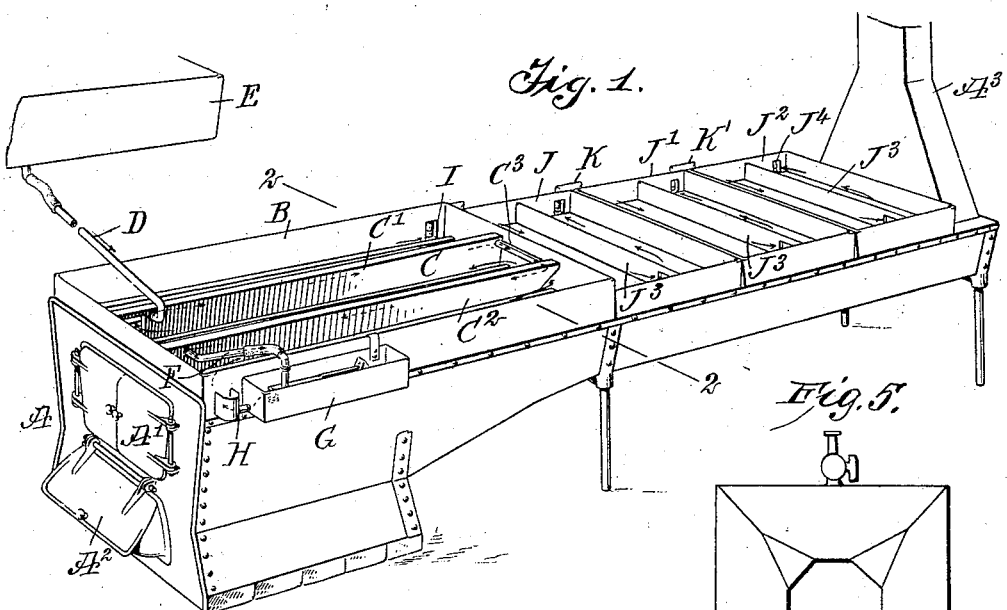
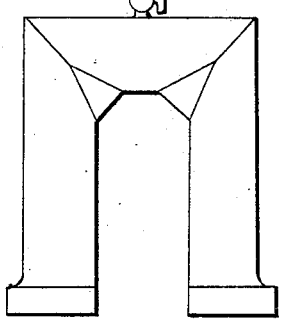
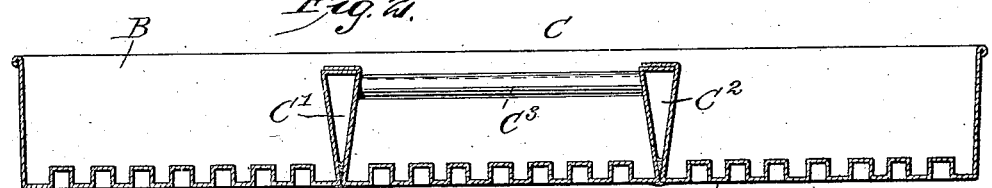
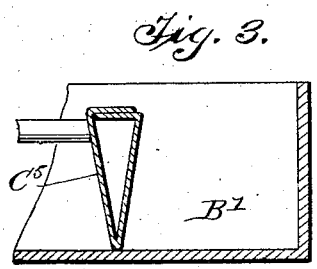
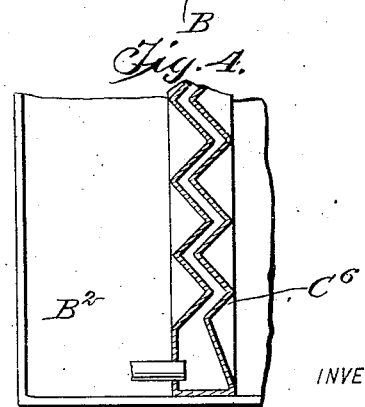
WITNESSES
INVENTOR
Gustav H. Grimm
BY
Munn & Co
ATTORNEYS

UNITED STATES PATENT OFFICE.

GUSTAV HENRY GRIMM, OF RUTLAND, VERMONT.

EVAPORATOR.

No. 884,272. Specification of Letters Patent. Patented April 7, 1908.

Application filed December 8, 1906. Serial No. 346,876.

*To all whom it may concern:*

Be it known that I, GUSTAV HENRY GRIMM, a citizen of the United States, and a resident of Rutland, in the county of Rutland and State of Vermont, have invented a new and Improved Evaporator, of which the following is a full, clear, and exact description.

The object of the invention is to provide a new and improved evaporator for use in the manufacture of maple sugar, sorghum, fruit jellies and other food products, and arranged to insure a steady flow of the sap, to prevent any scum and sediment from mixing with the sweet, syrup or like product, and to insure the production of a pure, light-colored syrup of high quality and fine flavor.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a perspective view of the improvement; Fig. 2 is an enlarged transverse section of the same on the line 2—2 of Fig. 1; Fig. 3 is a cross section of a pan and boiler of modified form; and Fig. 4 is a sectional plan view of another pan and boiler of modified form. Fig. 5 is a side view of one of the siphons.

The furnace A of the evaporator is of the usual construction, and is provided at the front end with a firing door $A'$ and an ash pit door $A^2$, and from the rear end of the furnace A leads a smoke stack $A^3$ for conducting the smoke and gases arising from the burning fuel in the furnace, to the outside of the building in which the evaporator is located. On top of the furnace A and at the front end thereof is arranged the boiling pan B containing a preliminary heating receptacle C for the sap or other liquid to be treated, and the said preliminary receptacle C is connected by a pipe D with an overhead tank E containing the sap, so that the latter flows by its own gravity through the receptacle, and from the latter by a pipe F into the regulator G having a connection H with the boiling pan B to maintain the sap at a uniform depth in the pan B.

The pan B is connected by a siphon I with the first evaporating pan J seated next to the boiling pan B. The pan J is connected by a siphon K with the second evaporating pan $J'$, and the latter is connected by a siphon $K'$ with the third evaporating pan $J^2$, and the several evaporating pans are located one alongside the other on the top of the furnace A at the rear portion thereof. Each of the evaporating pans, J, $J'$, $J^2$ is preferably provided with a transverse partition $J^3$ to cause the fluid to flow in a zig zag course through the several evaporating pans J, $J'$, $J^2$, to be finally discharged from the last evaporating pan at the outlet $J^4$. The regulator G the siphons and the pans J, $J'$, $J^2$ are of the usual construction, so that further detail description of the same is not deemed necessary.

The preliminary heating receptacle C in the boiling pan B is formed of two hollow partitions $C'$, $C^2$ extending longitudinally in the pan B, and connected with each other at the rear ends and near their tops by a cross pipe $C^3$. The front ends of the partitions $C'$ and $C^2$ are connected near the tops with the pipes D and F respectively. Each partition $C'$ and $C^2$ is preferably V-shaped in cross section, and its side members form integral parts of the sections forming the corrugated bottom of the pan B, as plainly indicated in Fig. 2; the side members of the partitions $C'$ and $C^2$ terminating at their upper ends in overlapping top members to close the partitions at the top. The lower or meeting edges of the side members of each partition are preferably fastened together by solder, as indicated in Fig. 2. The seam thus formed is not liable to become open as the sap covers the seam inside the partition and the sap is also close or adjacent to the seam within the pan B.

The partitions $C'$ and $C^2$ form with the sides of the pan B compartments for the flow of the sap, and the partition $C^2$ terminates a distance from the rear end of the pan B, to allow the sap entering the front end of the first compartment by the pipe H, to flow rearwardly and then into the rear end of the second or middle compartment to the front end thereof. The partition $C'$ terminates a distance from the front end of the pan B, so that the sap can flow from the front end of the middle compartment into the front end of the third compartment and rearwardly therein, to finally pass from the rear end of the third compartment by way of the siphon I into the first evaporating pan J.

Now when the apparatus is in use and the fuel in the furnace is burning then the pans B, J, J', J² and their contents are heated, and as the hollow partitions C', C² have their lower portions extending into the sap in the pan B, and the upper portions are subjected to the heat from the vapors rising in the pan B, it is evident that the sap in the said partitions C', C² and pipe C³ is heated and passes in a heated condition through the regulator G and pipe H into the pan B. The sap in its zig zag passage through the pan B is subjected to the highest heat developed in the furnace A, and hence the sap is boiled and thereby clarified, the scum being skimmed off, and the clarified sap only passes into the finishing pan J by way of the siphon I.

By the arrangement described, the sap from the storage tank receives a preliminary heating in the receptacle C before passing into the boiling tank B and without requiring an outside heating medium and without taking up much space in the boiling tank B, thus leaving the capacity of the latter practically untouched. It is also understood that the heater C is used for producing a zig zag flow in a longitudinal direction of the sap in the boiling pan B, and by constructing the pan B and the heater as described very little more material is used in the construction of the apparatus over apparatus as heretofore constructed.

The preliminary heating receptacle C⁵ shown in Fig. 3 is for use in boiling pans B' of evaporators as heretofore constructed and can be readily set up in the pan and connected as described in reference to the receptacle C in the pan B.

In the modified form shown in Fig. 4, the hollow receptacle C⁶ set in the pan B² is corrugated in a vertical direction, to form a zig zag passage for the sap in a longitudinal direction, thus increasing the heating capacity of the receptacle in a given length.

Having thus described my invention, I claim as new and desire to secure by Letters Patent:—

1. An evaporator having a pan, a preliminary heating receptacle in the form of a plurality of connected partitions arranged in the pan and extending into the sap contained in the pan, and a regulator for controlling the flow of the sap from the receptacle into the pan.

2. An evaporator having a pan, a preliminary heating receptacle in the form of a plurality of connected partitions arranged in the pan and extending into the sap contained in the pan, an overhead tank connected with the inlet end of the receptacle, and a regulator connected with the outlet end of the receptacle and with the said pan.

3. An evaporator provided with a preliminary heating receptacle approximately V-shaped in cross section, and a pan containing the said receptacle, the latter forming a partition in the pan.

4. An evaporator provided with a preliminary heating receptacle approximately V-shaped in cross section, and a pan containing the said receptacle, the latter forming a partition in the pan to provide separate compartments connected with each other at one end.

5. An evaporator provided with a preliminary heating receptacle approximately V-shaped in cross section, and a pan containing the said receptacle, the latter forming a partition in the pan, the bottom portion of the partition extending into the sap contained in the pan.

6. An evaporator provided with a preliminary heating receptacle approximately V-shaped in cross section, and a pan containing the said receptacle, the latter forming a partition in the pan, the bottom portion of the partition extending into the sap contained in the pan, the inlet and outlet being at the ends of the partition near the top.

7. An evaporator comprising a pan and a hollow partition therein for the passage of the sap through the partition and through the compartments formed by the partition, the said pan and partition being formed of sections, each section forming part of the pan and part of the partition.

8. An evaporator comprising a pan and a hollow partition therein for the passage of the sap through the partition and through the compartments formed by the partition, the said pan and partition being formed of sections, each having integral members, of which one forms part of the pan bottom and the other member a side of the hollow partition.

9. An evaporator comprising a pan and a hollow partition therein for the passage of the sap through the partition and through the compartments formed by the partition, the said pan and partition being formed of sections, each having integral members, of which one forms part of the pan bottom and the other member a side of the hollow partition, and lower meeting ends of the obliquely disposed sides of the partition being soldered together.

10. An evaporator comprising a pan and a hollow partition therein for the passage of the sap through the compartments formed by the partition, the said pan and partition being formed of sections, each having integral members, of which one forms part of the pan bottom and the other member a side and top of the hollow partition.

11. An evaporator having a pan, a preliminary heating receptacle arranged in the pan, said receptacle comprising a plurality of connected hollow sections, the sections being arranged in parallelism and spaced apart from each other, the alternate partitions being adjacent to one end of the pan, and the intermediate partitions adjacent to the other end.

In testimony whereof I have signed my name to this specification in the presence of two subscribing witnesses.

GUSTAV HENRY GRIMM.

Witnesses:
 THEO. G. HOSTER,
 EVERARD B. MARSHALL.